(12) United States Patent
Menard et al.

(10) Patent No.: US 10,885,731 B2
(45) Date of Patent: Jan. 5, 2021

(54) MOBILE TELEPHONE CAPABLE OF AUTOMATICALLY PAIRING WITH A MOTOR VEHICLE, AND AUTOMATIC PAIRING METHOD

(71) Applicant: VALEO COMFORT AND DRIVING ASSISTANCE, Creteil (FR)

(72) Inventors: Eric Menard, Créteil (FR); Fabienne Masson, Créteil (FR); Frederic Gehin, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/104,700

(22) PCT Filed: Dec. 19, 2014

(86) PCT No.: PCT/EP2014/078744
§ 371 (c)(1),
(2) Date: Jun. 15, 2016

(87) PCT Pub. No.: WO2015/091951
PCT Pub. Date: Jun. 25, 2015

(65) Prior Publication Data
US 2016/0358389 A1 Dec. 8, 2016

(30) Foreign Application Priority Data
Dec. 20, 2013 (FR) ..................... 13 03037

(51) Int. Cl.
*G07C 9/20* (2020.01)
*G07C 9/00* (2020.01)
(Continued)

(52) U.S. Cl.
CPC ........... *G07C 9/20* (2020.01); *G07C 9/00309* (2013.01); *G07C 9/00817* (2013.01);
(Continued)

(58) Field of Classification Search
CPC ...... G07C 2009/00769; G07C 9/00007; G07C 9/00309; G07C 9/00817; G07C 9/00857;
(Continued)

(56) References Cited

U.S. PATENT DOCUMENTS 8,776,189 B2 * 7/2014 Jain .................. G06K 19/07739
726/5
2012/0158213 A1 * 6/2012 Talty ...................... B60R 25/24
701/2
(Continued)

FOREIGN PATENT DOCUMENTS

DE 10 2008 008108 A1 8/2009
EP 2 112 797 A1 10/2009

OTHER PUBLICATIONS

International Search Report issued in PCT/EP2014/078744 dated Mar. 4, 2015 (3 pages).
(Continued)

*Primary Examiner* — Quan-Zhen Wang
*Assistant Examiner* — Rajsheed O Black-Childress
(74) *Attorney, Agent, or Firm* — Osha Bergman Watanabe & Burton LLP

(57) ABSTRACT

The invention relates to a mobile telephone (3) containing an authentication code (ID) for enabling a motor vehicle (2) to be locked/unlocked and/or started via a Bluetooth™ Low Energy (BLE) protocol, characterized in that said mobile telephone comprises: a pairing code (AP) for enabling the mobile telephone (3) to be registered automatically with said motor vehicle (2); and/or an identification code (VIN) for enabling the mobile telephone (3) to be recognized automatically in said motor vehicle (2).

20 Claims, 1 Drawing Sheet

(51) Int. Cl.
    *H04W 76/10*    (2018.01)
    *H04W 4/80*     (2018.01)
    *H04W 4/50*     (2018.01)
    *H04W 12/04*    (2009.01)
    *H04W 12/00*    (2009.01)
    *H04W 12/06*    (2009.01)
    *H04L 29/08*     (2006.01)

(52) U.S. Cl.
    CPC .......... *G07C 9/00857* (2013.01); *H04W 4/50* (2018.02); *H04W 4/80* (2018.02); *H04W 12/003* (2019.01); *H04W 12/04031* (2019.01); *H04W 12/06* (2013.01); *H04W 76/10* (2018.02); *G07C 2009/00769* (2013.01); *H04L 67/12* (2013.01)

(58) Field of Classification Search
    CPC ...... H04L 67/12; H04W 12/04; H04W 12/06; H04W 4/001; H04W 4/008; H04W 76/02
    See application file for complete search history.

(56) References Cited

U.S. PATENT DOCUMENTS

2013/0017816 A1    1/2013   Talty et al.
2013/0099892 A1    4/2013   Tucker et al.
2013/0303085 A1*  11/2013  Boucher ............... H04W 4/008
                                                  455/41.1

OTHER PUBLICATIONS

Written Opinion of the International Searching Authority issued in PCT/EP2014/078744 dated Mar. 4, 2015 (6 pages).

\* cited by examiner

MOBILE TELEPHONE CAPABLE OF AUTOMATICALLY PAIRING WITH A MOTOR VEHICLE, AND AUTOMATIC PAIRING METHOD

The invention concerns a mobile telephone used for locking/unlocking and/or starting a motor vehicle according to the Bluetooth™ Low Energy (BLE) protocol, which is capable of automatically pairing with said motor vehicle. The invention also concerns the method for automatic pairing between a mobile telephone, which is used for locking/unlocking and/or starting a motor vehicle according to the Bluetooth™ Low Energy protocol, and the motor vehicle.

Some motor vehicles today comprise a piece of control equipment, or a control device, that is arranged in a fixed manner inside the motor vehicle. This control equipment is responsible particularly for secure management of the requests received from accessories in the user's possession (electronic key, badge, etc.) so as to determine whether the transmitted request needs to prompt a command (for example unlocking the doors, starting the vehicle) on the vehicle. To this end, the control equipment interchanges data by means of short-range waves with identifying elements associated with the vehicle under consideration.

The identifying elements may today be an electronic key, sometimes called a "plip", or hands-free key, for example, that is in the form of an electronic badge. These identifying elements store identifying codes that are recognized by the motor vehicle with which they are paired, that is to say with which they are definitively associated in order to recognize one another. A data interchange allowing a command to be obtained on the vehicle, for example a command to unlock the doors or a command to start the vehicle, is effective between the electronic control equipment of the vehicle and the identifying element. Another example of a command on the vehicle may also be a command referred to as a "parking" command that involves an automatic maneuver by means of which the vehicle parks or pulls out without the driver necessarily being present inside.

In a first data interchange example, denoted as RKE (remote keyless entry) mode, an action, typically pushing a button, is performed on an identifying element of electronic key type. This action prompts said electronic key to transmit a radio frequency (RF) signal typically at 433 MHz. If the control equipment of the vehicle recognizes the identifiers conveyed by the RF signal, then it prompts a suitable command for the vehicle, for example unlocking of the doors.

In another data interchange example, denoted as "PEPS (passive entry/passive start) mode", an action is performed on the vehicle, for example grasping an exterior door handle. The vehicle detects this action and, by means of its control equipment, transmits a low-frequency signal at 125 KHz. The latter is received by the identifying element, which returns a radio frequency (RF) signal, typically at 433 MHz, in order to be identified, and if applicable recognized by the control equipment of the vehicle in order to prompt a suitable command for the vehicle under consideration.

If these systems work correctly and have become part of the use habits of vehicle owners, then they remain closed systems, that is to say systems using a specific communication protocol between the identifying element and the control equipment. Other equipment that could, owing to its mobile and lightweight nature, act as an identifying element for the vehicle is thus unable to access these functionalities on account of the specificity of the protocol existing up until then. This is the case with devices of mobile telephone type, for example, which are more and more widespread.

This is the reason why, in recent years, systems have been developed that use a more open communication protocol such as Bluetooth™ and more recently "Bluetooth™ Low Energy (BLE)"; the BLE protocol is used in optimized fashion particularly for best management of existing energy resources. The BLE protocol is also known by the name Bluetooth Smart (registered trademark).

On the basis of this system, it is today possible for a vehicle to be shared by multiple users. These sharing operations could be used to advantage by vehicle rental companies, inter alia. They are often denoted by the name "car sharing".

To allow a user to temporarily use a vehicle with the aid of his mobile telephone, he needs to load his mobile telephone with the authentication codes that allow him to access, start and/or use all the other existing functions of the vehicle in a manner of a user who owned the vehicle.

Once the authentication codes are loaded on the mobile telephone, there continue to be some disadvantages.

First, although the mobile telephone has elements that allow it to lock/unlock and/or start the vehicle on the basis of the loaded authentication codes, the security level of the system is not the same as that of a key that has been paired in the factory or at the dealership.

It follows that the user will have to have his mobile telephone recorded by the vehicle. This operation can prove complicated and particularly require the presence of a physical person who is already authorized to access the vehicle, such as the renter of the vehicle.

There is more and more demand to be able to rent a vehicle totally autonomously, that is to say without the physical presence of a person from the rental company, while guaranteeing a maximum security level.

Moreover, as the authentication codes are received by a mobile telephone, there is the question of provision of security for these sensitive data. The reason is that devices of mobile telephone type are potentially more open than a remote access identifier of conventional type.

Finally, when an interchange of hands-free access type according to the Bluetooth™ Low Energy protocol, for example, is initiated, a situation exists in which the vehicle acts as master equipment within the context of the BLE protocol. The result of this is that it will listen to all surrounding equipment and send an authentication request, inter alia, to said equipment. Sending of all its requests is superfluous, it would therefore be useful to limit sending of a request only to a piece of equipment that will prove to be authorized, that is to say that has the valid authentication codes.

To this end, the subject of the invention is a mobile telephone containing an authentication code to allow a motor vehicle to be locked/unlocked and/or started by Bluetooth™ Low Energy (BLE) protocol, characterized in that it has a pairing code, to allow automatic recording of the mobile telephone with said motor vehicle, and/or an identification code to allow automatic recongnition of the mobile telephone near said motor vehicle.

The mobile telephone according to the invention may moreover have one or more of the following features, taken on their own or in combination:

the telephone moreover comprises a secure memory element;
  the authentication code is stored in the secure memory element;
  the pairing code is stored in the secure memory element;

the identification code is stored in the secure memory element;

the secure memory element is a SIM card.

The subject of the invention is also a method for pairing a mobile telephone with a motor vehicle, characterized in that it comprises:

the step of loading the mobile telephone with a pairing code, to allow automatic recording of the mobile telephone with said motor vehicle.

The pairing method according to the invention may moreover have one or more of the following features, taken on their own or in combination:

it comprises the step in which the mobile telephone takes up BLE communication with the vehicle and transmits the previously loaded pairing code; and the step in which if the vehicle confirms the compliance of the transmitted pairing code, records the mobile telephone as paired;

it comprises the step in which the mobile telephone records the pairing code in a secure memory element of the mobile telephone;

it comprises the step in which the mobile telephone records the identification code in a secure memory element of the mobile telephone;

the pairing code is loaded from a remote server on the GSM network;

the identification code is loaded from a remote server on the GSM network;

it comprises the prior step of loading the mobile telephone with an authentication code to allow the motor vehicle to be locked/unlocked and/or started by BLE protocol;

the authentication code is loaded from a remote server on the GSM network;

it comprises the step in which the mobile telephone records the authentication code in a secure memory element of the mobile telephone;

the secure memory element of the mobile telephone is a SIM card;

it comprises the step of loading the mobile telephone with an identification code, to allow automatic recognition of the mobile telephone near said motor vehicle.

Other advantages and features will emerge upon reading the description of the invention that is provided by way of example, and from the appended figures, in which:

FIG. 1 shows a key 1 for locking/unlocking and/or starting a motor vehicle 2.

Figure 2:
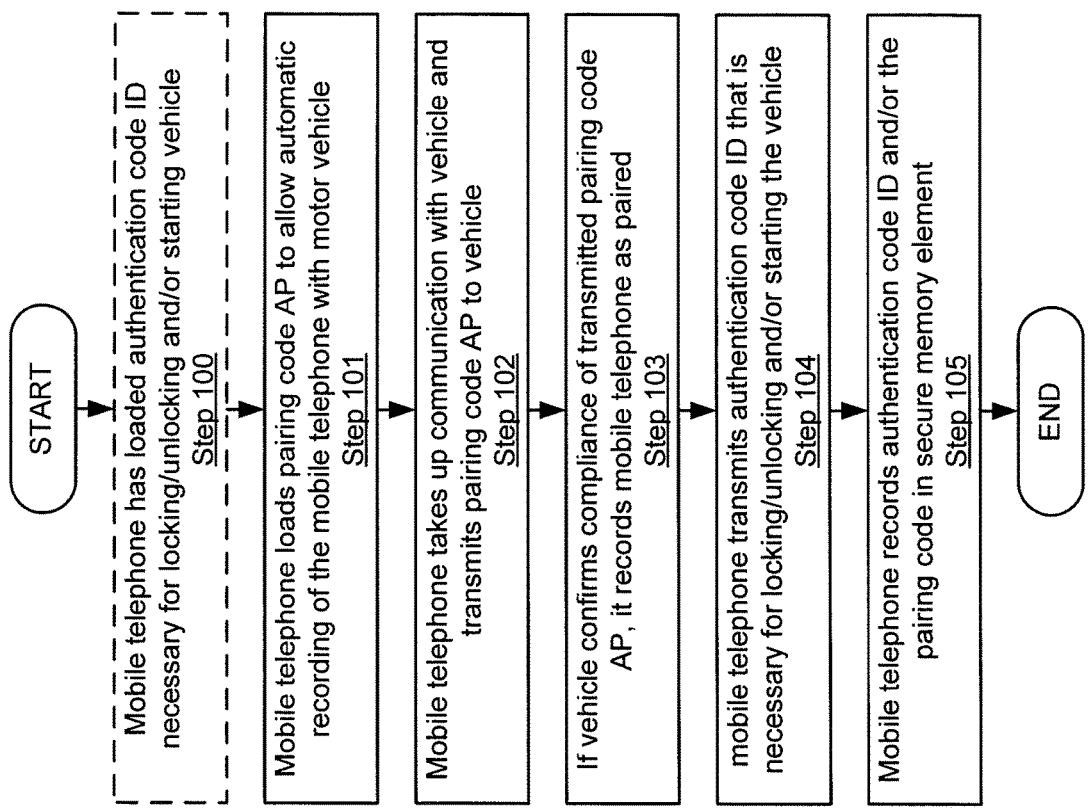
FIG. 2 shows a flowchart of the steps of a pairing method according to a first embodiment, In these figures, identical elements bear the same reference numerals.
Figure 1:
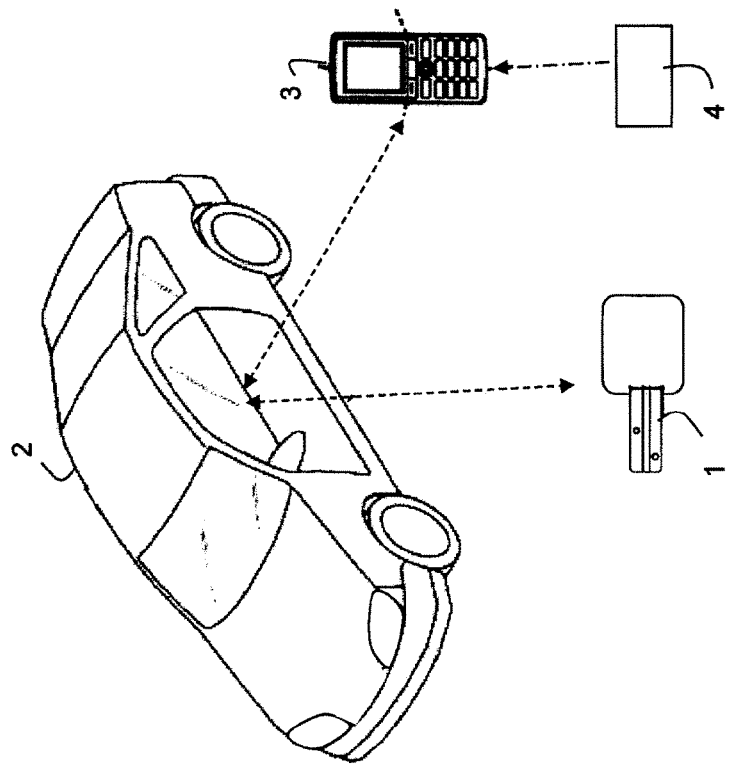
FIG. 1 shows a diagram of a motor vehicle locking/unlocking and/or starting assembly.

This locking/unlocking and/or starting key 1 may advantageously have a communication interface configured to communicate according to the Bluetooth™ Low Energy (BLE) protocol. The key 1 may also have a metal insert that has a unique locking/unlocking pattern associated with a lock of the vehicle.

The locking/unlocking and/or starting key 1 is generally configured in the factory or at the dealership by loading an authentication code ID that is necessary for locking/unlocking and/or starting according to the BLE protocol. The key 1 is also recorded by the vehicle 2 as paired, that is to say that it can currently communicate with the motor vehicle 2 according to the BLE protocol at the best security level.

According to the principles of the invention, it is also possible to authorize a piece of equipment of mobile telephone type 3 to work as a key for locking/unlocking and/or starting the vehicle 2 according to the BLE protocol without performing the configurations that are carried out in the factory or at the dealership.

This type of mobile telephone commonly comprises, in addition to communication interfaces of GSM type, a communication interface according to the BLE protocol.

To allow this operation as a key for locking/unlocking and/or starting the vehicle 2 according to the BLE protocol, an authentication code ID that is necessary for locking/unlocking and/or starting the vehicle 2 according to the BLE protocol is loaded.

In this configuration, locking/unlocking and/or starting of the vehicle 2 is not carried out at the same security level for the interchanges as after recording, or pairing of the mobile telephone 3 with the vehicle 2.

To save the user a complicated operation of having the mobile telephone 3 recorded by the vehicle 2, the invention presented here proposes loading a pairing code AP on the mobile telephone 3, prior to the first BLE interchange between the mobile telephone 3 and the vehicle 2.

Having thus been loaded on the mobile telephone 3, the pairing code AP will be automatically transmitted by the mobile telephone 3 at the request of the vehicle 2, at the time of a BLE interchange between the mobile telephone 3 and the vehicle 2. Then, once the pairing code AP has been confirmed by the vehicle 2, the identity of the mobile telephone will be recorded to allow the best security level for all subsequent communication between the mobile telephone 3 and the vehicle 2, according to the BLE protocol.

In a first embodiment, the pairing code AP is transmitted in the course of the first interchanges between the mobile telephone 3 and the vehicle 2, that is to say when the user is about to access the vehicle 2 for the first time. Considering the large amount of time for the interchanges between the mobile telephone and the vehicle 2 in this phase of confirming the pairing code, the user will be confronted by the wall effect, that is to say that when he pulls the door handle of the vehicle 2, not all of the interchanges for authorizing unlocking will have completed. By contrast, at a second attempt and on all subsequent operations between the mobile telephone 3 and the vehicle 2, confirmation of the pairing code AP will no longer be necessary and therefore the operations will take place under the same conditions as with a key coming from a factory or dealership.

In an advantageous embodiment, there is provision for access to the vehicle 2 to be authorized the basis of the authentication codes ID without prior performance of confirmation of the pairing code. Once access is authorized, confirmation of the pairing code can be undertaken. The wall effect is avoided while allowing subsequent communications between the mobile telephone 3 and the vehicle 2 to take place at the best security level.

In a certain configuration for BLE interchanges between the vehicle 2 and the mobile telephone 3, for example to authorize hands-free access, there exists a situation in which the vehicle 2 acts as master equipment and the mobile telephone acts as slave equipment within the context of the BLE protocol.

The result of this is that the vehicle 2 will perform a scan of all BLE equipment present in its surroundings, and, if it identifies multiple pieces of BLE equipment offering a suitable service, will send them an authentication request, inter alia. As sending of all its requests is superfluous, the invention presented here proposes loading an identification code VIN. Thus, when the vehicle has completed its scanning step, if it identifies a piece of equipment having the suitable service and having communicated the valid identification code VIN to it, it will send an authentication request only to this piece of equipment.

Of course, it is possible to remove a recorded mobile telephone 3. This removal may be either automatic depending on a validity period accorded to the mobile telephone or intentional in order to mitigate loss or theft of the mobile telephone 4.

According to a first embodiment, the pairing code AP is loaded on the mobile telephone 3 from a remote server 4. This operation takes place following reservation, by the user of the mobile telephone 3, of the vehicle 2 with a car rental company, for example.

According to another advantageous embodiment, the identification code VIN is also loaded on the mobile telephone 3 from a remote server 4.

According to an advantageous embodiment, the authentication code ID which is necessary for the mobile telephone 3 to lock/unlock and/or start the vehicle 2 according to the BLE protocol, is also loaded on the mobile telephone 3 from a remote server 4.

In a first embodiment, the pairing code AP, the identification code VIN and the authentication code ID are loaded in the course of one and the same operation.

In an alternative embodiment, the pairing code AP, the identification code VIN and the authentication code ID are loaded in the course of separate operations.

The remote servers used are generally servers managed by the telephone operators. In this case, the authentication ID and/or pairing AP codes are advantageously transmitted by the GSM network.

There may also be provision for the remote server to be the rented vehicle or, in an alternative embodiment, another mobile telephone.

Once the codes have been loaded, and to reduce the possibility of hacking of these codes, which could lead to theft of the vehicle 2, provision is made for the use, in the mobile telephone 3, of a secure memory element SEC in which the codes will be stored.

Access to the data stored in this type of secure memory element SEC requires input of a personal code. On the other hand, these elements are capable of detecting any attempts at physical intrusion and of self-destructing in order to preserve the secret data stored.

In an alternative embodiment, only the authentication code ID will be stored in the secure memory element SEC.

On the other hand, it may be advantageous to use the SIM card that is already present in the mobile telephone 4 as secure memory element SEC.

There now follows a description of the main steps of the method for automatically pairing a mobile telephone 3 with a motor vehicle 2 (FIG. 2) according to a first embodiment.

The first consideration is that in a prior step 100, the mobile telephone 3 has loaded the authentication code ID that is necessary for locking/unlocking and/or starting the vehicle 2 according to the Bluetooth™ Low Energy (BLE) protocol.

In a first step 101, the mobile telephone 3 loads a pairing code AP to allow automatic recording of the mobile telephone 3 with the motor vehicle 2.

In a subsequent step 102, the mobile telephone 3 takes up communication with the vehicle 2 and transmits the pairing code AP to the vehicle 2.

If the vehicle 2 confirms the compliance of the transmitted pairing code AP, it records the mobile telephone 3 as paired in a step 103.

Once recorded as paired by the vehicle 2, the mobile telephone 3 transmits, in a step 104, the authentication code ID that is necessary for locking/unlocking and/or starting the vehicle 2.

In a preferred embodiment, which is not shown, step 104 of transmitting the authentication code ID that is necessary for locking/unlocking and/or starting the vehicle 2 precedes steps 102 and 103 that allow the mobile telephone 3 to be recorded as paired.

As indicated previously, this embodiment makes it possible to avoid the wall effect that can occur on the first attempted access for a method according to the first embodiment.

In an advantageous additional step 105, the mobile telephone 3 records the authentication code ID and/or the pairing code in a secure memory element SEC.

In a preferred embodiment, the secure memory element SEC is the SIM card of the mobile telephone.

According to a first embodiment, in steps 100 and 101, for loading the authentication code ID and the pairing code AP, respectively, the authentication code ID and the pairing code AP are respectively loaded on the mobile telephone 3 from a remote server 4. This operation takes place following reservation, by the user of the mobile telephone 3, of the vehicle 2 with a car rental company, for example.

In a first embodiment, the pairing code AP and the authentication code ID are loaded in the course of one and the same operation.

In another embodiment, the pairing code AP and the authentication code ID are loaded in the course of separate operations.

The remote servers 4 used are generally servers managed by telephone operators.

On the other hand, the authentication ID and/or pairing AP codes are advantageously transmitted by the GSM network.

There may likewise be provision for the remote server to be the rented vehicle or, in an alternative embodiment, another mobile telephone.

The invention claimed is:

1. A mobile telephone comprising:
    an authentication code to allow a motor vehicle to be locked/unlocked and/or started by Bluetooth™ Low Energy (BLE) protocol;
    a pairing code AP to allow automatic pairing and recording of the mobile telephone with said motor vehicle;
    an identification code to allow automatic recognition of the mobile telephone near said motor vehicle; and
    a secure memory element,
    wherein:
        the authentication code, the pairing code AP, and/or the identification code are stored in the secure memory element,
        the mobile telephone and the motor vehicle perform an automatic pairing process that automatically pairs the mobile telephone and the motor vehicle using the authentication code, the pairing code AP, and the identification code,
        the pairing code AP is loaded on the mobile telephone by a remote server prior to a first BLE communication via the BLE protocol between the mobile telephone and the motor vehicle, and
        the pairing code AP is automatically transmitted by the mobile telephone at a request of the motor vehicle during the first BLE communication between the mobile telephone and the motor vehicle.

2. The mobile telephone as claimed in claim 1, wherein the secure memory element is a SIM card.

3. A method for pairing a mobile telephone with a motor vehicle according to Bluetooth™ Low Energy (BLE) protocol, the method comprising:
 loading, by a remote server, a pairing code AP to the mobile telephone being carried out prior to a first BLE communication via the BLE protocol between the mobile telephone and the motor vehicle,
  wherein the pairing code allows automatic pairing and recording of the mobile telephone with said motor vehicle, and
  wherein the mobile telephone and the motor vehicle perform an automatic pairing process that automatically pairs the mobile telephone and the motor vehicle using an authentication code, the pairing code AP, and an identification code;
 transmitting, by the mobile telephone and during the first BLE communication with the motor vehicle, the previously loaded pairing code obtained from the remote server,
  wherein the pairing code AP is automatically transmitted by the mobile telephone at a request of the motor vehicle during the first BLE communication between the mobile telephone and the motor vehicle;
 confirming, by the vehicle, a compliance of the transmitted pairing code; and
 recording, by the motor vehicle, the mobile telephone as paired if the compliance is confirmed.

4. The pairing method as claimed in claim 3, wherein the secure memory element of the mobile telephone is a SIM card.

5. The pairing method as claimed in claim 3, wherein the remote server on a GSM network.

6. The pairing method as claimed in claim 3, further comprising:
 loading, by the remote server, the mobile telephone with an authentication code prior to the first BLE communication between the mobile telephone and the motor vehicle,
 wherein the authentication code allows the motor vehicle to be locked/unlocked and/or started by BLE protocol.

7. The pairing method as claimed in claim 6, wherein the remote server is on a GSM network.

8. The pairing method as claimed in claim 6, further comprising:
 recording, by the mobile telephone, the previously loaded authentication code in a secure memory element of the mobile telephone.

9. The pairing method as claimed in claim 8, wherein the secure memory element of the mobile telephone is a SIM card.

10. The pairing method as claimed in claim 3 comprising:
 loading, by the remote server, the mobile telephone with an identification code prior to the first BLE communication between the mobile telephone and the motor vehicle,
 wherein the identification code allows automatic recognition of the mobile telephone near said motor vehicle.

11. The pairing method as claimed in claim 10, wherein the remote server is on a GSM network.

12. The pairing method as claimed in claim 10, further comprising:
 recording, by the mobile telephone, the previously loaded identification code in a secure memory element of the mobile telephone.

13. A method for pairing a mobile telephone with a motor vehicle according to Bluetooth™ Low Energy (BLE) protocol, the method comprising:
 transmitting a BLE pairing code from a remote server to the mobile telephone;
 receiving, by the mobile telephone, the BLE pairing code;
 after the BLE pairing code is received, loading the BLE pairing code in the mobile telephone prior to a first BLE communication via the BLE protocol between the mobile telephone and the motor vehicle;
 after the BLE pairing code is loaded in the mobile telephone, automatically starting pairing and recording of the mobile telephone with the motor vehicle by establishing the first BLE communication with the motor vehicle;
 after establishing the first BLE communication between the mobile telephone and the motor vehicle, transmitting, by the mobile telephone, the BLE pairing code obtained from the remote server to the motor vehicle;
 determining, by the motor vehicle, a compliance of the BLE pairing code received by the mobile telephone from the remote server;
 confirming, by the motor vehicle, the compliance of the BLE pairing code;
 recording, by the motor vehicle, the mobile telephone as paired; and
 recording, by the mobile telephone, the BLE pairing code in a secure memory element of the mobile telephone,
 wherein compliance of the BLE pairing code is based on the specific mobile telephone to which the server transmitted the BLE pairing code,
 wherein the mobile telephone and the motor vehicle perform an automatic pairing process that automatically pairs the mobile telephone and the motor vehicle using an authentication code, the BLE pairing code, and an identification code, and
 wherein the BLE pairing code is automatically transmitted by the mobile telephone at a request of the motor vehicle during the first BLE communication between the mobile telephone and the motor vehicle.

14. The pairing method as claimed in claim 13, wherein the secure memory element of the mobile telephone is a SIM card.

15. The pairing method as claimed in claim 13, wherein the remote server is on a GSM network.

16. The pairing method as claimed in claim 13, further comprising:
 after the motor vehicle confirms the compliance of the BLE pairing code, loading the mobile telephone with an authentication code that allows the mobile telephone to unlock/lock the motor vehicle.

17. The pairing method as claimed in claim 16, wherein the remote server is on the GSM network.

18. The pairing method as claimed in claim 16, further comprising:
 recording, by the mobile telephone, the authentication code in a secure memory element of the mobile telephone.

19. The pairing method as claimed in claim 16, wherein the secure memory element of the mobile telephone is a SIM card.

20. The pairing method as claimed in claim 13, further comprising:
 after the motor vehicle confirms the compliance of the BLE pairing code, loading the mobile telephone with an authentication code that allows the motor vehicle to automatically detect the mobile telephone near the motor vehicle;
recording, by the motor vehicle, the mobile telephone as paired;
wherein the authentication code enables the motor vehicle to automatically detect one paired mobile telephone per BLE code transmitted by the server.

\* \* \* \* \*